(12) United States Patent
Nishikawa

(10) Patent No.: US 11,843,521 B2
(45) Date of Patent: Dec. 12, 2023

(54) INFORMATION PROCESSING APPARATUS, METHOD, AND STORAGE MEDIUM FOR GENERATING A SCHEDULE FOR MANAGING A DEVICE VIA A NETWORK

(71) Applicant: CANON KABUSHIKI KAISHA, Tokyo (JP)

(72) Inventor: Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/820,737

(22) Filed: Aug. 18, 2022

(65) Prior Publication Data
US 2023/0063508 A1    Mar. 2, 2023

(30) Foreign Application Priority Data
Sep. 2, 2021   (JP) .................................. 2021-142930

(51) Int. Cl.
*H04L 41/34*   (2022.01)

(52) U.S. Cl.
CPC .................................. *H04L 41/34* (2022.05)

(58) Field of Classification Search
CPC .......... H04L 41/34; H04L 41/22; Y02D 10/00
See application file for complete search history.

(56) References Cited

U.S. PATENT DOCUMENTS

| 11,418,619 | B1 * | 8/2022 | Mattison | H04W 52/0216 |
| 2018/0295583 | A1 * | 10/2018 | Cornwall | H04W 52/0216 |
| 2019/0260832 | A1 * | 8/2019 | Tokuchi | H04L 41/046 |
| 2020/0073461 | A1 * | 3/2020 | Sadowski | G06F 1/329 |

FOREIGN PATENT DOCUMENTS

| JP | 2016153992 A | 8/2016 | |
| WO | WO-2021110421 A1 * | 6/2021 | G01S 19/16 |

* cited by examiner

*Primary Examiner* — Tonia L Dollinger
*Assistant Examiner* — Joseph M Cousins
(74) *Attorney, Agent, or Firm* — Canon U.S.A., Inc. IP Division

(57) ABSTRACT

An information processing apparatus sets a first schedule determining a timing of transmitting, to a management target device, an instruction to transit the management target device to a predetermined power supply state in which a request via a network fails and sets a second schedule determining a timing of transmitting, to the management target device, a request to acquire operation information via the network, and provides, when the second schedule is set, a function of automatically adjusting the second schedule so that a period during which the request via the network fails based on the first schedule does not overlap the timing of transmitting the request based on the second schedule and that the operation information is acquired.

7 Claims, 15 Drawing Sheets

FIG.5

| | DEVICE NAME | HOST NAME | IP ADDRESS | SERIAL NUMBER |
|---|---|---|---|---|
| ☐ | Device1 | host21 | 192.168.10.87 | 18993354 |
| ☐ | Device2 | host31 | 192.168.10.100 | 18993344 |
| ☐ | Device3 | host44 | 192.168.10.110 | 18993343 |

DEVICE   SETTING   POWER SUPPLY MANAGEMENT   ✕

SELECT ALL    DESELECT ALL

FIG.6

| | DEVICE | SETTING | POWER SUPPLY MANAGEMENT | ✕ |

| SELECT ALL | DESELECT ALL |

| | DEVICE NAME | HOST NAME | IP |
|---|---|---|---|
| ☐ | Device1 | host21 | 192. |
| ☐ | Device2 | host31 | 192. |
| ☐ | Device3 | host44 | 192. |

STATUS

COUNTER

SECURITY POLICY

FIG.7

| SCHEDULE | ✕ |

☐ EXECUTION AT STARTUP OF SERVER    [ADVANCED SETTINGS]

EXECUTION DATE AND TIME  [2021/07/01 13:00]

■ REPEATING INTERVAL  [30] [MINUTES] [+]

| EXECUTION TIME | REPEATING INTERVAL | |
|---|---|---|
| 2021/07/01 13:00 | 30 MINUTES | − |

[SAVE] [CANCEL]

FIG.8

| POWER SUPPLY MANAGEMENT SCHEDULE | | | ✕ |
|---|---|---|---|

OPERATION TYPE — POWER OFF ▽

EXECUTION START DATE AND TIME — 2021/07/01 22:00

REPEAT — EVERY DAY  [+]

| REPEAT | EXECUTION TIME | REPEAT | |
|---|---|---|---|
| POWER OFF | 2021/07/01 22:00 | EVERY DAY | − |

SAVE    CANCEL

FIG.9

| SCHEDULE | ✕ |
|---|---|

☐ EXECUTION AT STARTUP OF SERVER    [ADVANCED SETTINGS]

EXECUTION DATE AND TIME: 2021/07/01 22:30

■ REPEATING INTERVAL  24  HOURS  [+]

| EXECUTION TIME | REPEATING INTERVAL | |
|---|---|---|
| 2021/07/01 22:30 | 24 HOURS | − |

[SAVE] [CANCEL]

FIG.14

| SCHEDULE | ✕ |

☐ EXECUTION AT STARTUP OF SERVER          [ADVANCED SETTINGS]

EXECUTION DATE AND TIME: 2021/07/01 22:30

☐ REPEATING INTERVAL  [24] [HOURS] [+]

| EXECUTION TIME | REPEATING INTERVAL | |
|---|---|---|
| 2021/07/01 22:30 | 24 HOURS | − |

[SAVE] [CANCEL]

FIG.15

| POWER SUPPLY MANAGEMENT SCHEDULE | | | |
|---|---|---|---|
| OPERATION TYPE | POWER OFF ⌄ | | |
| EXECUTION START DATE AND TIME | 2021/07/01 22:00 | | |
| REPEAT | EVERY DAY | [+] | |

| REPEAT | EXECUTION TIME | REPEAT | |
|---|---|---|---|
| POWER OFF | 2021/07/01 22:00 | EVERY DAY | − |
| POWER OFF | 2021/07/03 19:00 | EVERY WEEK | − |
| RESTART | 2021/07/05 12:00 | EVERY DAY | − |

SAVE    CANCEL

INFORMATION PROCESSING APPARATUS, METHOD, AND STORAGE MEDIUM FOR GENERATING A SCHEDULE FOR MANAGING A DEVICE VIA A NETWORK

BACKGROUND

Field of the Disclosure

The present disclosure relates to a technique for realizing appropriate device management in a case where a device excluded from management targets is present in a device management system including one or more devices connected via a network.

Description of the Related Art

Management applications (programs) for providing management functions to a plurality of devices connected via a network have been available in an office. More specifically, a device management system is available that selects a device from a list of devices found in the network, and performs a task such as device security monitoring and device power supply management on the device (e.g., Japanese Patent Application Laid-Open No. 2016-153992).

In some cases, as a part of the device security monitoring, the management application is used to transmit, via the network, a request to set a setting value according to appropriate security policy in a device installation environment, to a management target device. The management application has a function of automatically transmitting an acquisition request via the network, based on a schedule for periodic acquisition of operation information for the management target device.

In some cases, a period during which the device is turned off and a period during which power of the device is saved are defined in operation in an office where the device is installed. The management application is to have a function of scheduling these periods with instruction commands via the network.

A screen for setting the request transmission schedule is provided individually for each request. Therefore, in a case where the schedules are overlapped with one another, a user such as an administrator hardly grasp the overlapped schedules.

SUMMARY

Some embodiments of the present disclosure are directed to functionality enabling appropriate operation of the schedule management for the device management.

According to an aspect of some embodiments, an information processing apparatus that manages device information for a management target device in a storage unit and in which a management application configured to manage the management target device via a network is executed, includes one or more memories; and one or more processors that cooperate with the one or more memories to: set a first schedule determining a timing of transmitting, to the management target device, an instruction to transit the management target device to a predetermined power supply state in which a request via the network fails; set a second schedule determining a timing of transmitting, to the management target device, one or more acquisition requests to acquire operation information via the network; and provide, when the second schedule is set, a function of automatically adjusting the second schedule so that a period during which a network request via the network fails due to the instruction transmitted based on the first schedule does not overlap the timing of transmitting the one or more acquisition requests based on the second schedule and that the operation information is acquired at a time other than the period during which the network request fails due to at least a part of the one or more acquisition requests based on the second schedule.

Further features of various embodiments will become apparent from the following description of exemplary embodiments with reference to the attached drawings.

BRIEF DESCRIPTION OF THE DRAWINGS

FIG. 5 is a diagram illustrating a screen relating to a device list, provided by the device management server.

FIG. 6 is a diagram illustrating a screen relating to a setting menu, provided by the device management server.

FIG. 7 is a diagram illustrating a setting screen relating to status acquisition, provided by the device management server.

FIG. 8 is a diagram illustrating a setting screen relating to power supply management, provided by the device management server.

FIG. 9 is a diagram illustrating a setting screen relating to security policy, provided by the device management server.

FIG. 14 is a diagram illustrating a setting screen relating to security policy according to the second exemplary embodiment.

FIG. 15 is a diagram illustrating a screen relating to a power supply management schedule according to the second exemplary embodiment.

DESCRIPTION OF THE EMBODIMENTS

<Description of System Configuration>

Figure 1:
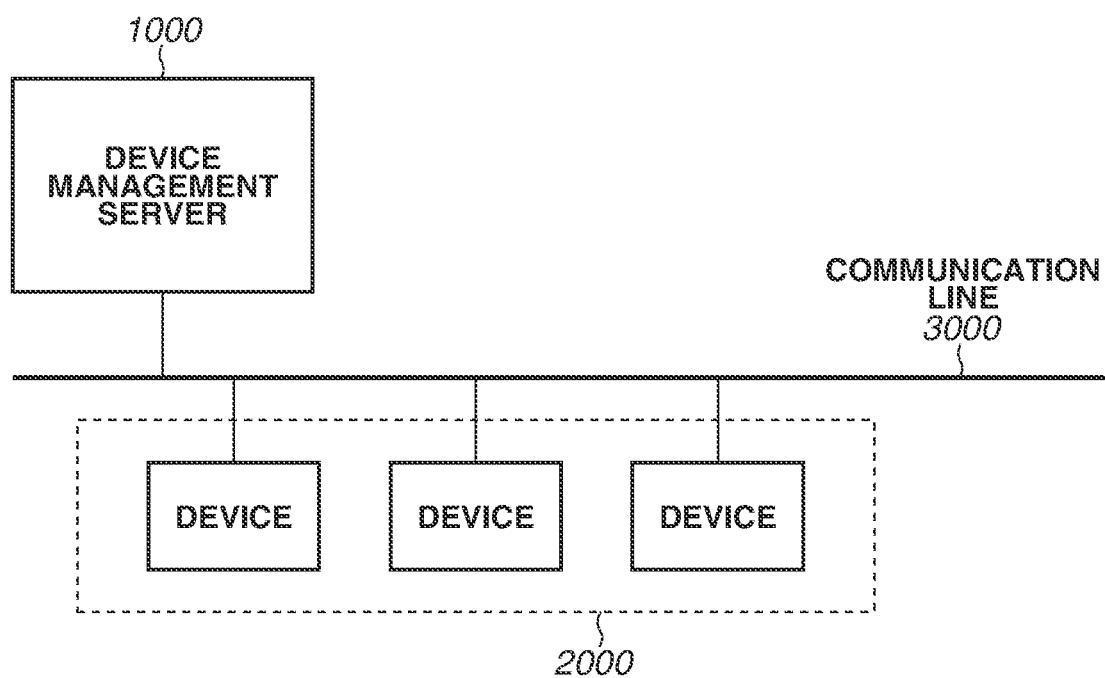
FIG. 1 is a diagram illustrating a configuration example of a device management system.

FIG. 1 is a schematic diagram illustrating a configuration of a device management system according to an exemplary embodiment of the present disclosure.

FIG. 1 illustrates a device management server 1000 and a plurality of devices 2000 which are connected. Each of the devices 2000 receives print data through a network, and performs printing on an actual sheet by using a known printing technique, such as an electrophotographic technique and an inkjet technique. Each of the devices 200 has functions of reading a paper document with a scanner, performing copy, converting data into image data, and transmitting the image data by an e-mail. A printer not having a copy function is also adoptable as the device 2000. The device management server 1000 and the devices 2000 are connected by a communication line 3000 that constructs a network such as a local area network (LAN).

Figure 3:
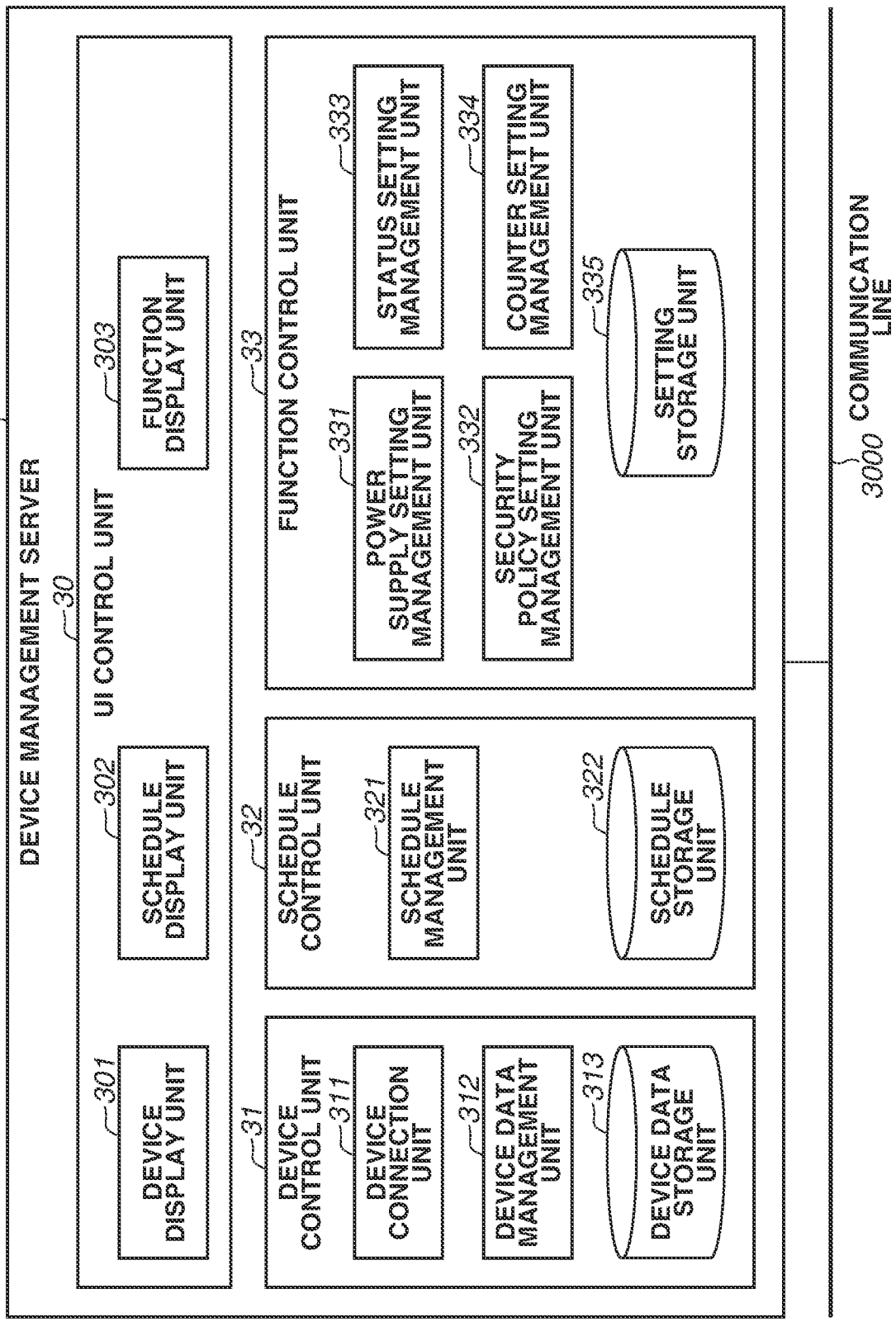
FIG. 3 is a block diagram illustrating a module configuration example of software of a device management server.

The device management server 1000 is an information processing apparatus that executes a management application (program) to provide functions of a user interface (UI) control unit 30, a device control unit 31, a schedule control unit 32, and a function control unit 33 illustrated in FIG. 3, in order to manage the devices 2000.

<Hardware Configuration of Information Processing Apparatus>

Figure 2:
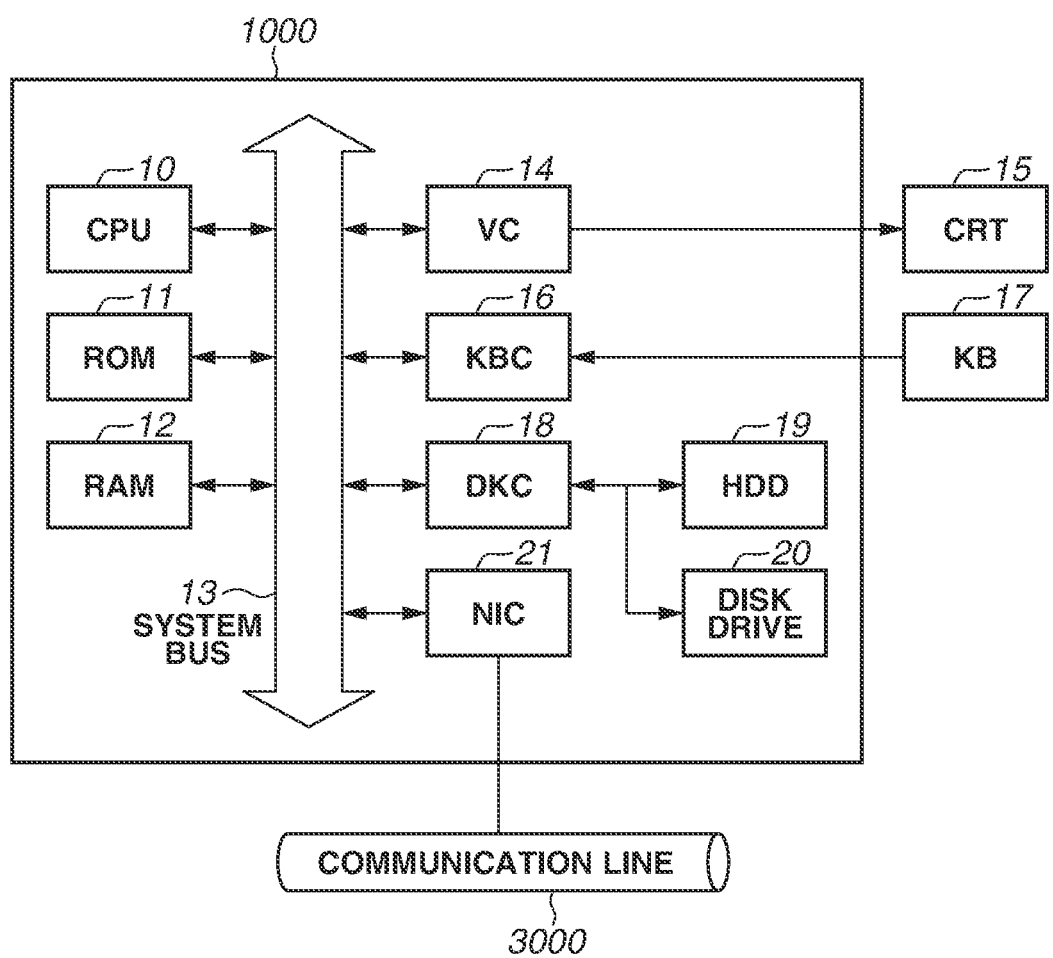
FIG. 2 is a block diagram illustrating an example of a hardware configuration of an information processing apparatus.

FIG. 2 illustrates a configuration example of hardware of the information processing apparatus which serves as the device management server 1000.

One or more processors (e.g., a central processing unit (CPU) 10) execute various programs, such as an operating system (OS) and software (management application), stored in a read only memory (ROM) 11 and a hard disk drive (HDD) 19 by using a random access memory (RAM) 12 as a work area.

Components of the device management server 1000 are connected through a system bus 13. The device management server 1000 includes a disk controller (DKC) 18, a disk drive 20 on which a storage medium, such as a compact disc read only memory (CD-ROM), a digital versatile disc (DVD), a magnetic tape, and an integrated circuit (IC) memory card, is mountable, a video card (VC) 14, and a display apparatus (CRT) 15. The device management server 1000 includes a keyboard controller (KBC) 16, a keyboard (KB) 17, and a pointing device (not illustrated) such as a mouse. The device management server 1000 performs data communication with apparatuses on the communication line 3000 via a network interface board (NIC) 21.

<Software Configuration of Device Management Server>

FIG. 3 illustrates a module configuration example of software of the UI control unit 30, the device control unit 31, the schedule control unit 32, and the function control unit 33 which operate in the device management server 1000. The module configuration example indicates main parts of processing (described below) which is realized when device management software (management application) is executed, and is executed by the CPU 10 in the RAM 12, the ROM 11, and the HDD 19 in FIG. 2.

The UI control unit 30 includes a device display unit 301, a schedule display unit 302, and a function display unit 303. The device control unit 31 includes a device connection unit 311, a device data management unit 312, and a device data storage unit 313. The schedule control unit 32 includes a schedule management unit 321 and a schedule storage unit 322. The function control unit 33 includes a power supply setting management unit 331, a security policy setting management unit 332, a status setting management unit 333, a counter setting management unit 334, and a setting storage unit 335.

The UI control unit 30 performs UI control of the device control unit 31, the schedule control unit 32, and the function control unit 33 by respectively using the device display unit 301, the schedule display unit 302, and the function display unit 303. The device management software is realizable as a web-based application. In such a case, UI control unit 30 is usable through a web browser.

The device connection unit 311 has functions of device search, information collection from the devices, and setting execution. More specifically, the device connection unit 311 has a device search function for the devices 2000 by using simple network management protocol (SNMP), internet protocol (IP) broadcast, service location protocol (SLP)/multicast, and the like. At this time, the device connection unit 311 searches for the devices 2000 at a certain timing. The device connection unit 311 has a function of acquiring and changing device information such as management information base (MIB) security policy information, through the communication line 3000 such as a LAN. As the device information, information acquired as operation information from each of the devices, such as status information, counter information, and log information, is also managed.

The device connection unit 311 acquires, as a result of the device search, device identification information, such as a device name, a product name, and an IP address, and stores the device identification information as device information in the device data storage unit 313. The device data management unit 312 manages data, such as the device information, on a management target device stored by the device data storage unit 313.

The schedule management unit 321 generates a schedule input through the schedule display unit 302 in cooperation with the functions of the function control unit 33, manages the resultant, and stores the schedule in the schedule storage unit 322.

Each of the power supply setting management unit 331, the security policy setting management unit 332, the status setting management unit 333, and the counter setting management unit 334 of the function control unit 33 generates functional information based on input through the function display unit 303, manages the resultant, and stores the functional information in the setting storage unit 335.

The device data storage unit 313, the schedule storage unit 322, and the setting storage unit 335 can save data in a database that operates in the HDD 19, or in an external storage service. Table data of a schedule list, a device list, a function list, and the like is stored in each of the storage units.

<Software Configuration of Device>

Figure 4:
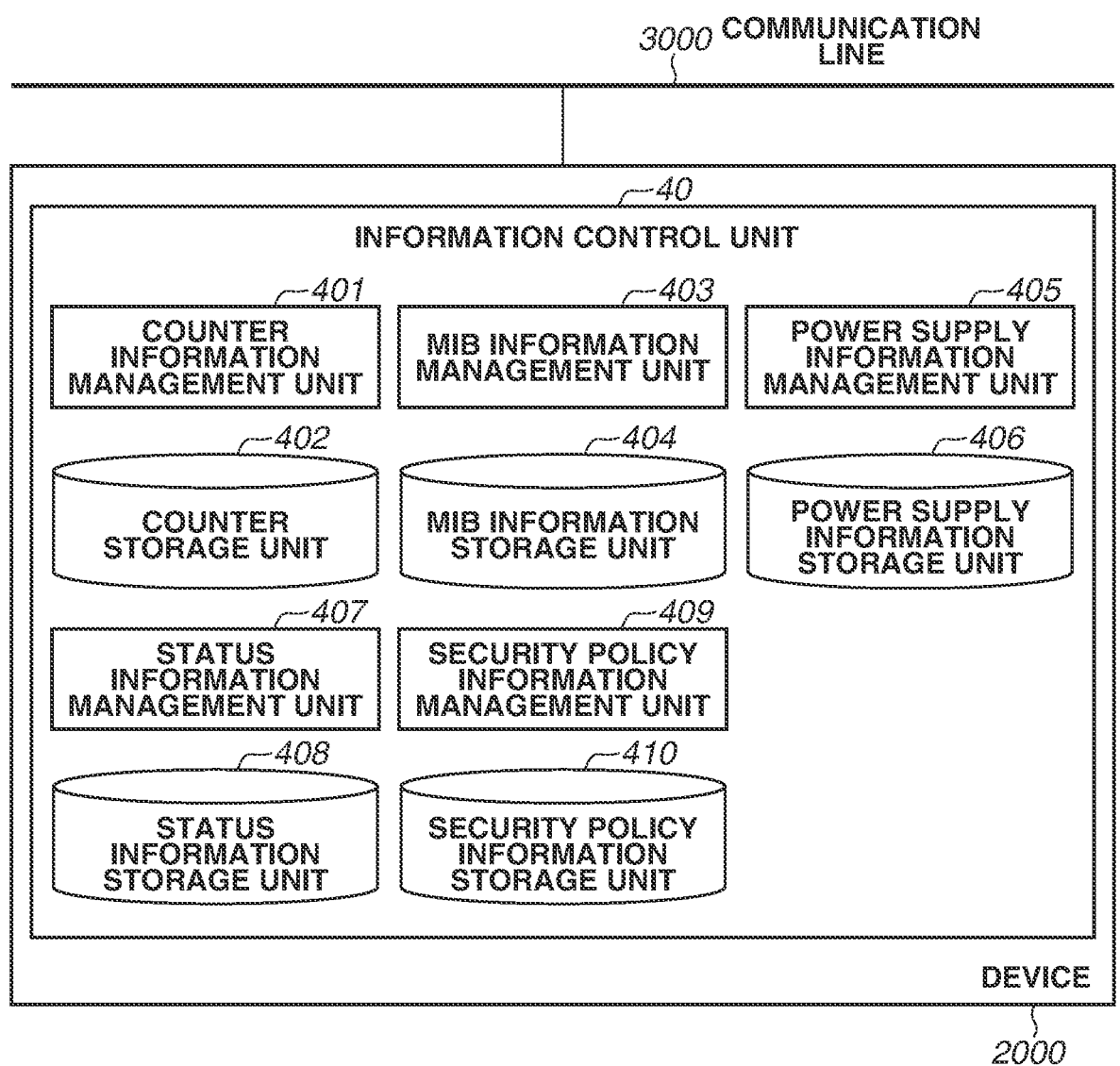
FIG. 4 is a block diagram illustrating an example of an internal configuration of a device.

FIG. 4 illustrates a software configuration example of an information control unit 40 that operates in each of the devices 2000.

Each of the devices 2000 includes, as a software module, the information control unit 40 to manage a plurality of information groups which dynamically change. A counter information management unit 401 manages the number of print pages and the like, and stores the number of print pages and the like in a counter storage unit 402. An MIB information management unit 403 manages MIB information which is the above-described device information, and stores the MIB information in an MIB information storage unit 404. A power supply information management unit 405 manages power-off information and reboot information, and stores the power-off information and the reboot information in a power supply information storage unit 406. A status information management unit 407 manages information about a status, such as an online state, an offline state, and an error, and stores the status information in a status information storage unit 408. A security policy information management unit 409 manages security policy information such as password setting policy and port restriction, and stores the security policy information in a security policy information storage unit 410. The data is transmitted to the device management server 1000 by using SNMP or other protocols in response to a request from the device management server 1000.

In each of the devices 2000, transition of a power supply state, such as power off, power saving, and returning from power saving, is performed in response to an input to a main body and a request via the network. Even when the device management server 1000 transmits a request to acquire operation information or a request to perform various settings, to the device 2000 that is in a power-off state or in a predetermined power saving state, via the network, processing corresponding to the request is not performed in the device, and the request fails. In another power saving state other than the predetermined power saving state, the device 2000 may automatically return from the power saving state in response to the request transmitted via the network, and the device 2000 may perform processing corresponding to the request.

<Processing of Schedule Generation>

FIG. 5 to FIG. 8 each illustrate a screen example of the device management server 1000. Processing of generating schedules for the status, the counter, the security policy, and the power supply management will be described with reference to FIG. 5 to FIG. 8.

The device management server 1000 searches for devices in the network, as management target devices. Examples of the algorithm for the search include SNMP; however, the algorithm is not limited to SNMP. FIG. 5 illustrates a screen example after the search. Names and information (host name, IP address, serial number, etc.) of found devices are displayed.

To generate a schedule, a target device is first selected from the found devices. The device is selected by, for example, checking a check box corresponding to the device illustrated in FIG. 5. After the device is selected, and "setting" is pressed, items settable to the selected device are listed as illustrated in FIG. 6. In this example, as selectable tasks, the status, the counter, and the security policy are listed. The settable tasks are determined based on a type of the device, functions held by the device, and the like.

FIG. 7 illustrates an example of a screen which is displayed in a case where "status" is selected in a setting menu illustrated in FIG. 6 and in which a status acquisition schedule is set. In the screen, "execution time and date" and "repeating interval" are set. A plurality of schedules is settable, and schedules currently set are displayed on a lower part of the screen. The schedules can be deleted and added as needed. In the setting currently made in this example, the status is scheduled to be acquired every 30 minutes from 2021/07/01 13:00, and the setting of the schedule is saved when "save" is pressed. It is possible to select whether to perform the acquisition at startup of the device management server 1000 by a check box of "execution at startup of server" being checked. In a case where advanced settings specific to the item are present, the settings can be made from "advanced settings".

The management application can provide a setting screen for "power supply management" when the device is selected in FIG. 5. FIG. 8 illustrates an example of a setting screen in which a power supply management schedule is settable.

Initially, "operation type" is set. Sleep, sleep cancel, restart, or power-off is selectable. Further, "execution start time and date" and "repeat" are set.

A plurality of such schedules is settable, and the schedules currently set are displayed on a lower part of the screen. The schedules can be deleted and added as appropriate. In the setting currently made in this example, power-off is scheduled every day from 2021/07/01 22:00, and the setting of the schedule is saved when "save" is pressed. Making the series of settings enables various acquisition schedules and power supply management schedules to be generated for the selected device, and subsequent operation is performed.

Figure 10:
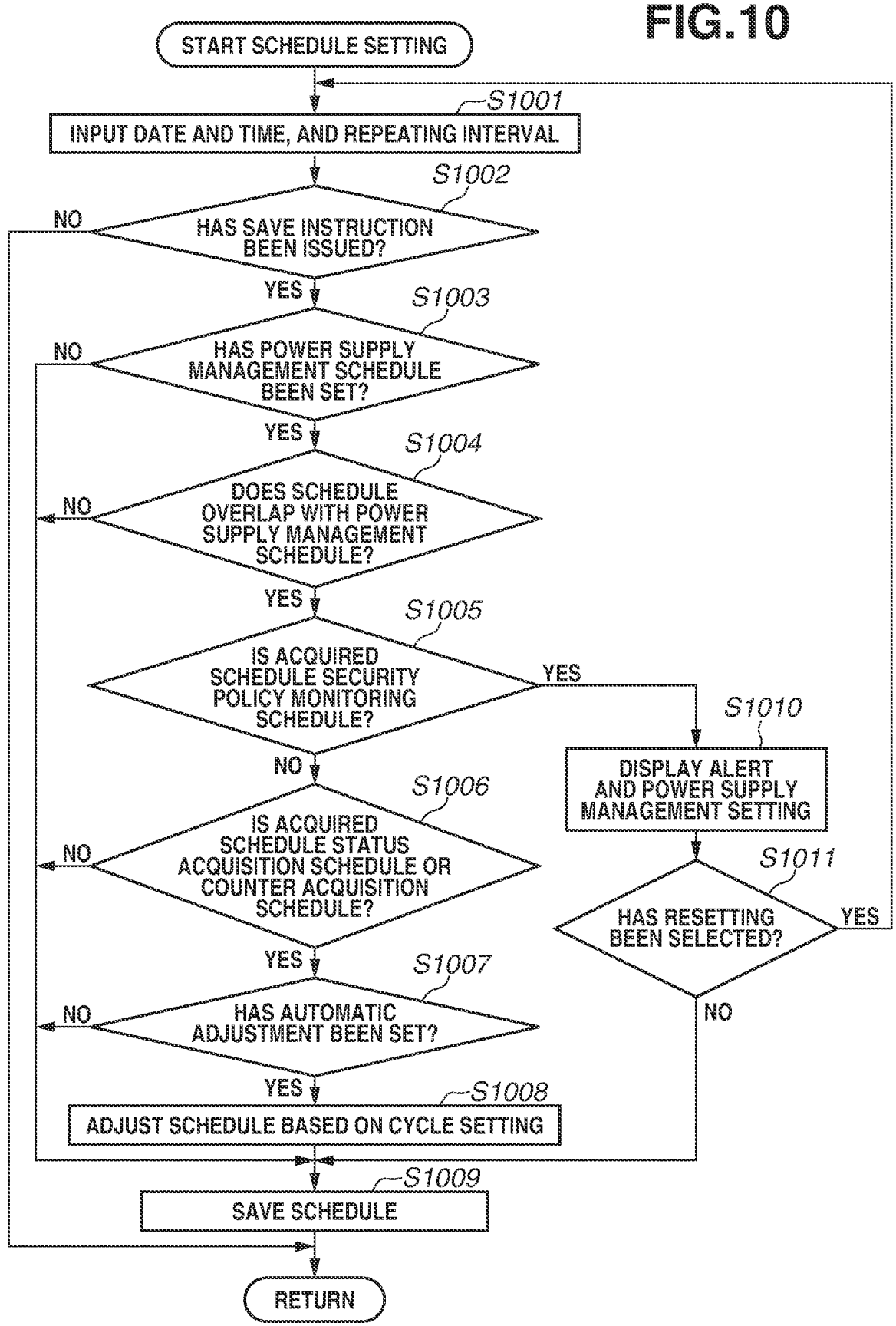
FIG. 10 is a flowchart illustrating processing which is performed by a device management server according to a first exemplary embodiment.
Figure 13:
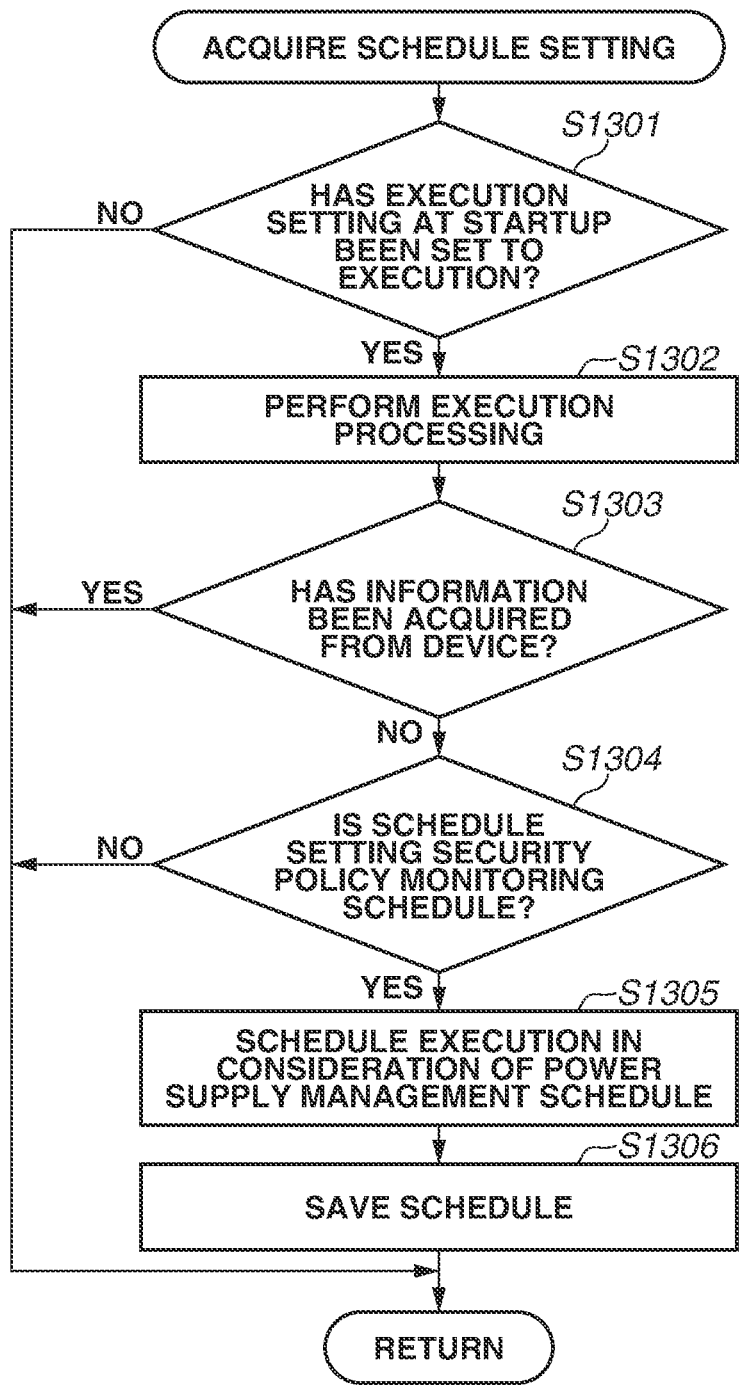
FIG. 13 is a flowchart illustrating processing which is performed by a device management server according to a second exemplary embodiment.

FIG. 10 and FIG. 13 are flowcharts each illustrating processing which is performed by the device management server 1000. The operations in each step is realized by the CPU 10 loading the management application (program) from the HDD 19, the ROM 11, and the like to the RAM 12, and executing the management application (program).

A first exemplary embodiment of the present disclosure will be described below. The processing for the schedule function which is performed by the device management server 1000 will be described with reference to the flowchart in FIG. 10. A description of the processing will be supplemented by using operation cases in FIG. 11 and FIG. 12. The processing illustrated in FIG. 10 is realized by the CPU 10 executing the device management software.

When the device management server 1000 generates each schedule, the device is selected in the UI, as illustrated in FIG. 5, the item to be set is selected in the UI illustrated in FIG. 6, and the schedule setting is then started as described above.

In step S1001, the schedule management unit 321 acquires the execution date and time and acquires the repeating interval input through the schedule display unit 302. In step S1002, the schedule display unit 302 determines whether a save instruction has been issued. If the schedule display unit 302 determines that the save instruction has been issued (YES in step S1002), the processing proceeds to step S1003. If the schedule display unit 302 determines that the save instruction has not been issued (NO in step S1002), the processing returns to the schedule setting operation. In step S1003, the schedule management unit 321 determines whether the power supply management schedule has been set based on the schedules saved in the schedule storage unit 322. If the schedule management unit 321 determines that the power supply management schedule has been set (YES in step S1003), the processing proceeds to step S1004. If the schedule management unit 321 determines that the power supply management schedule has not been set (NO in step S1003), the processing proceeds to step S1009. In step S1004, the schedule management unit 321 determines whether the schedule acquired in step S1001 overlaps the power supply management schedule checked in step S1003. If the schedule management unit 321 determines that the schedules overlap (YES in step S1004), the processing proceeds to step S1005. If the schedule management unit 321 determines that the schedules do not overlap (NO in step S1004), the processing proceeds to step S1009.

In step S1005, the schedule management unit 321 determines whether the schedule acquired in step S1001 is a security policy monitoring schedule. If the schedule management unit 321 determines that the schedule is the security policy monitoring schedule (YES in step S1005), the processing proceeds to step S1010. If the schedule management unit 321 determines that the schedule is other than the security policy monitoring schedule (NO in step S1005), the processing proceeds to step S1006.

In step S1006, the schedule management unit 321 determines whether the schedule acquired in step S1001 is a status acquisition schedule or a counter acquisition schedule. If the schedule management unit 321 determines that the schedule is the status acquisition schedule or the counter acquisition schedule (YES in step S1006), the processing proceeds to step S1007. If the schedule management unit 321 determines that the schedule is other than these schedules (NO in step S1006), the processing proceeds to step S1009.

In step S1007, the status setting management unit 333 or the counter setting management unit 334 determines whether automatic adjustment has been set to the information stored in the setting storage unit 335. If the status setting management unit 333 or the counter setting management unit 334 determines that the automatic adjustment has been set (YES in step S1007), the processing proceeds to step S1008. If the status setting management unit 333 or the counter setting management unit 334 determines that the automatic adjustment has not been set (NO in step S1007), the processing proceeds to step S1009. In step S1008, the schedule management unit 321 adjusts the schedule based on cycle setting of the automatic adjustment stored in the setting storage unit 335. After the schedule is determined, the processing proceeds to step S1009.

In step S1009, the schedule storage unit 322 stores the schedule determined by the schedule management unit 321 in step S1008, in a storage unit, and the processing returns to the processing by the schedule display unit 302, and the schedule setting processing in FIG. 10 ends.

In step S1010, the power supply setting management unit 331 displays alert and power supply setting details through the function display unit 303 of the UI control unit 30. The processing then proceeds to step S1011. In step S1011, the power supply setting management unit 331 displays whether to perform resetting of the security policy monitoring schedule, through the function display unit 303 of the UI control unit 30, and determines whether a resetting button has been pressed. If the power supply setting management unit 331 determines that resetting is selected (YES in step S1011), the processing returns to step S1001. If the power supply setting management unit 331 determines that resetting is not selected (NO in step S1011), the processing proceeds to step S1009.

Figure 11:
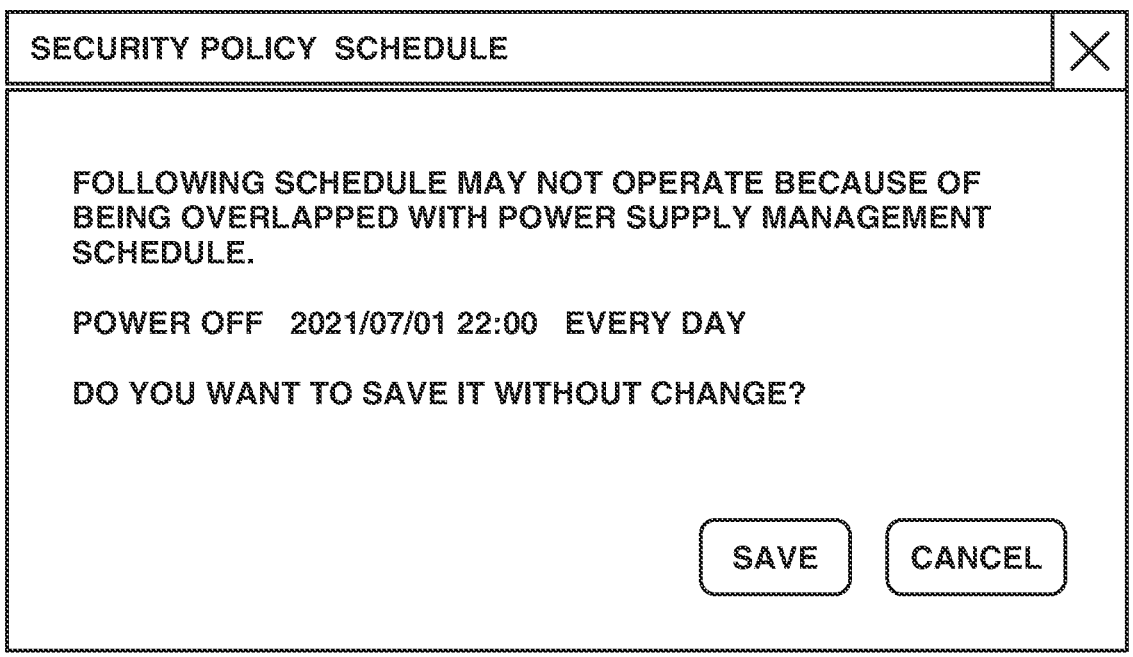
FIG. 11 is a diagram illustrating a confirmation screen relating to security policy according to the first exemplary embodiment.
Figure 12:
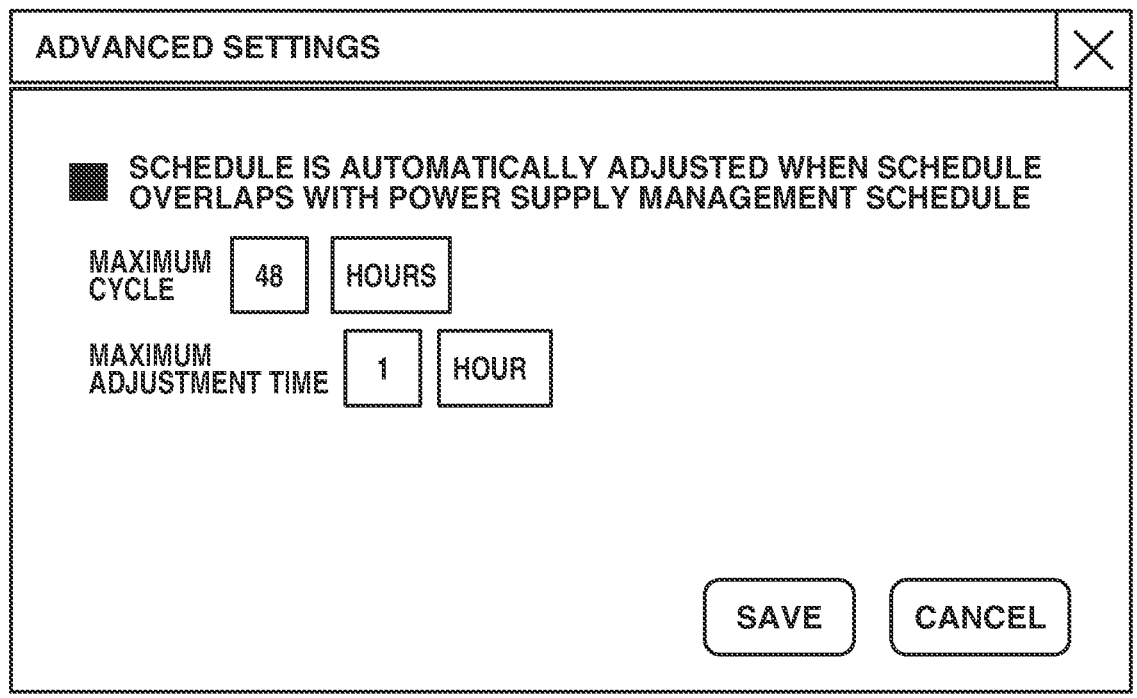
FIG. 12 is a diagram illustrating an advanced setting screen relating to operation information acquisition according to the first exemplary embodiment.

Supplemental description will be provided with reference to screen examples illustrated in FIG. 11 and FIG. 12.

Initially, it is assumed that, in the power supply management schedule in FIG. 8 described above, the power-off setting of the execution time: 2021/07/01 22:00 and the repeat: every day, has been set. Thereafter, it is assumed that, in the screen examples illustrated in FIG. 5 and FIG. 6, a device name Device 2 and security policy thereof are selected, and setting of the execution time: 2021/07/01 22:30 and the repeating interval: 24 hours, is to be input and saved.

In step S1001, the above-described security policy schedule is acquired, and in step S1002, it is determined that the save instruction has been issued. The power supply management schedule is previously set. Thus, it is determined in step S1003 that the power supply management schedule has been set, and the processing proceeds to step S1004. In step S1004, it is determined that the security policy monitoring schedule overlaps a power-off time because the power-off schedule is set to 22:00. Thus, the processing proceeds to step S1005. Since the schedule is the security policy monitoring schedule, the processing proceeds to step S1010. In step S1010, alert and the power supply management schedule are displayed. FIG. 11 illustrates a screen example thereof. In step S1011, to make resetting, a "cancel" button in FIG. 11 is pressed and the screen returns to the schedule setting screen in FIG. 9. To save the schedule without change, a "save" button is pressed, and the schedule is saved in step S1009.

It is assumed that, in the screen examples illustrated in FIG. 5 and FIG. 6, a device name Device 2 and a status thereof are selected, and settings of the execution time: 2021/07/01 22:30 and repeating interval: 24 hours, is to be input and saved.

In a screen illustrated in FIG. 12, as advanced settings relating to acquisition of the operation information (in this case, status information), setting of "schedule is automatically adjusted when schedule overlaps power supply management schedule" is settable.

It is assumed that the maximum cycle: 48 hours, and the maximum adjustment time: 1 hour are currently set. The maximum cycle refers to a setting about a maximum cycle of acquisition of the information from the device. The maximum adjustment time refers to a setting about a maximum allowable shift time of the input time. In a case where a period during which the acquisition request via the network fails is present due to the power state of the target device which operates in accordance with the power supply management schedule, the schedule (acquisition request timing) is automatically adjusted based on the settings in FIG. 12 so that the operation information is acquired at a time other than that period.

The operations in steps S1001 to S1004 are similar to those in the above-described example; however, since the status is selected, the determinations in steps S1005 and S1006 are made based on the selection of the status, and the processing proceeds to step S1007. In step S1007, it is determined that the automatic adjustment has been set. In step S1008, the schedule is adjusted based on the cycle setting. Since the maximum cycle: 48 hours and the maximum adjustment time: 1 hour have been set, the status acquisition at every 48 hours is performed at 21:30, which is a time when the apparatus is not turned off.

It is assumed that, in the power supply management schedule in FIG. 8, the power-off setting of the execution time: 2021/07/01 22:00 and the repeat: every other day is set. Thereafter, it is assumed that, in the screen examples illustrated in FIG. 5 and FIG. 6, a device name Device 2 and counter thereof are selected, and setting of the execution time: 2021/07/01 22:30 and the repeating interval: 24 hours is to be input and saved.

Further, it is assumed that the automatic adjustment has not been set.

The operations in steps S1001 to S1004 are similar to those in the above-described example; however, since the counter is selected, the determinations in steps S1005 and S1006 are made based on the selection of the counter, and the processing proceeds to step S1007. In step S1007, it is determined that the automatic adjustment has not been set. In step S1009, the schedule is saved.

In this example, the schedule is saved without change with no alert issued. A part of the requests based on the acquisition schedules succeeds (in this case, request performed at timing when apparatus is not turned off succeeds), and the counter is acquired every other day.

In the schedule generation, in the case where the security policy monitoring schedule overlaps the power supply management schedule, it is possible to issue an alert and to prompt resetting through the series of these operations. In the case where the status acquisition schedule or the counter acquisition schedule overlaps the power supply management schedule, the schedule can be set without change. The schedule adjusted based on the cycle setting can be saved depending on presence or absence of the automatic adjustment setting.

A second exemplary embodiment of the present disclosure will be described below. FIG. 9 illustrates an example of a setting screen relating to the security policy. The setting screen is equivalent to the setting screen in FIG. 5 described above. In this example, attention is paid to an item of "execution at startup of server". When the setting is valid, it is possible to try a request to acquire information or the like at startup of the device management server 1000.

In a case where the security policy monitoring schedule is set while the information cannot be acquired at startup of the device management server 1000, the resetting may be made in consideration of the power supply management schedule. The processing to be performed in such a case will be described in detail with reference to FIG. 13. Further, a supplementary description of the processing will be provided with reference to screen examples in FIG. 14 and FIG. 15.

At startup of the device management server 1000, the schedule setting is acquired by each of the functions.

In step S1301, the schedule management unit 321 determines whether execution setting at startup previously acquired from the schedule storage unit 322 has been set to execution. If the schedule management unit 321 determines that the execution setting has been set to execution (YES in step S1301), the processing proceeds to step S1302. Otherwise (NO in step S1301), the schedule processing at startup ends. In step S1302, the schedule management unit 321 tries task execution processing by transmitting a request to acquire information to the device based on the setting of each management unit of the function control unit 33. The processing then proceeds to step S1303.

In step S1303, the schedule management unit 321 determines whether the information has been acquired from the device. If the schedule management unit 321 determines that the information has been acquired from the device (YES in step S1303), the schedule processing at startup ends. Otherwise (NO in step S1303), the processing proceeds to step S1304. In step S1304, the schedule management unit 321 determines whether the schedule setting is security policy monitoring schedule. If the schedule management unit 321 determines the schedule setting is the security policy monitoring schedule (YES in step S1304), the processing proceeds to step S1305. If the schedule management unit 321 determines that the schedule setting is other than the security policy monitoring schedule (NO in step S1304), the schedule processing ends.

In step S1305, the schedule management unit 321 schedules execution so as to prevent an overlap with a time zone of sleep, restart, and power-off, in consideration of the power supply management schedule acquired from the setting storage unit 335. The processing then proceeds to step S1306.

In step S1306, the schedule determined by the schedule management unit 321 in step S1305 is saved in the schedule storage unit 322. The schedule processing then ends.

Now, a supplemental description will be provided with reference to the screen examples illustrated in FIG. 14 and FIG. 15. Unlike FIG. 9, in the screen example illustrated in FIG. 14, it is assumed that the check box of "execution at startup of server" is checked at previous setting of the security policy schedule.

As illustrated in the screen example in FIG. 15, it is assumed that, in the power supply management schedule, the power-off setting of the execution time: 2021/07/01 22:00, the repeat: every day, and the execution time: 2021/07/03 19:00, the repeat: every week, and restart setting of the execution time: 2021/07/05 12:00 and the repeat: every day have been set.

At startup of the device management server 1000, the schedule setting is acquired by each of the functions. This is similarly performed at restart of the device management server 1000. The security policy schedule is acquired, and it is determined in step S1301 that the execution setting at startup described above has been set to execution. In step S1302, the task is executed. In step S1303, it is assumed that the information cannot be acquired. In step S1304, determination as to whether the schedule setting is security policy monitoring schedule is made, and in step S1305, execution is reset in consideration of the power supply management schedule. At this time, setting is made such that the time when the power is turned off or the time when the restart is performed is avoided based on the current date and time. For example, in a case where it is necessary to perform re-execution at a time close to 2021/07/03 19:00, re-execution is not performed after 19:00 on that day. Further, for a time close to 2021/07/05 12:00, re-execution is performed after 12:30 on that day. A possible interval before re-execution may be designated and is not limited. Thereafter, the schedule is saved in step S1305, and the corresponding processing is executed at the set time.

When the information cannot be acquired at startup of the device management server 100 while the check box of "execution at startup of server" is checked at setting of the security policy monitoring schedule, the resetting can be performed by the series of operation in consideration of the power supply management schedule through a series of these operations.

OTHER EXEMPLARY EMBODIMENTS

Some embodiments of the present disclosure include an apparatus or a system configured by appropriately combining the above-described exemplary embodiments, and a method thereof.

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to some embodiments of the present disclosure, it is possible to provide functionality with which appropriate operation of the schedule management for the device management is enabled.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-142930, which was filed on Sep. 2, 2021 and which is hereby incorporated by reference herein in its entirety.

What is claimed is:

1. A method for an information processing apparatus, the method comprising:
    managing device information for a management target device in a storage of the information processing apparatus;
    setting, as a first setting, a first schedule determining a timing of transmitting, to the management target device via a network, an instruction to transit the management target device to a predetermined power supply state;
    setting, as a second setting, a second schedule determining a timing of transmitting, to the management target device, one or more acquisition requests to acquire operation information via the network, wherein a period in which the management target device is in the predetermined power supply state is a period during which every acquisition request to be transmitted via the network based on the second schedule fails due to the instruction transmitted based on the first schedule; and
    after determining that the period during which every acquisition request to be transmitted via the network based on the second schedule fails due to the instruction transmitted based on the first schedule overlaps the timing of transmitting the one or more acquisition requests based on the second schedule, automatically generating an adjusted second schedule,
    wherein the period during which every acquisition request to be transmitted via the network based on the second schedule fails due to the instruction transmitted based on the first schedule does not overlap the timing of transmitting the one or more acquisition requests based on the adjusted second schedule, and
    wherein, due to at least a part of the one or more acquisition requests based on the adjusted second schedule, the operation information is acquired at a time other than the period during which every acquisition request to be transmitted via the network based on the second schedule fails due to the instruction transmitted based on the first schedule.

2. A non-transitory computer readable storage medium on which is stored a computer program for making a computer execute a method for an information processing apparatus, the method comprising:
    managing device information for a management target device in a storage of the information processing apparatus;
    setting, as a first setting, a first schedule determining a timing of transmitting, to the management target device via a network, an instruction to transit the management target device to a predetermined power supply state;
    setting, as a second setting, a second schedule determining a timing of transmitting, to the management target device, one or more acquisition requests to acquire operation information via the network, wherein a period in which the management target device is in the predetermined power supply state is a period during which every acquisition request to be transmitted via the network based on the second schedule fails due to the instruction transmitted based on the first schedule; and
    in a case where the period during which every acquisition request to be transmitted via the network based on the second schedule fails due to the instruction transmitted based on the first schedule overlaps the timing of transmitting the one or more acquisition requests based on the second schedule, automatically generating an adjusted second schedule,
    wherein the period during which every acquisition request to be transmitted via the network based on the second schedule fails due to the instruction transmitted based on the first schedule does not overlap the timing of transmitting the one or more acquisition requests based on the adjusted second schedule, and
    wherein, due to at least a part of the one or more acquisition requests based on the adjusted second schedule, the operation information is acquired at a time other than the period during which every acquisition request to be transmitted via the network based on the second schedule fails due to the instruction transmitted based on the first schedule.

3. An information processing apparatus that manages device information for a management target device in a storage unit and in which a management application configured to manage the management target device via a network is executed, the information processing apparatus comprising:
    one or more memories; and
    one or more processors that cooperate with the one or more memories to:
    set a first schedule determining a timing of transmitting, to the management target device, an instruction to transit the management target device to a predetermined power supply state;
    set a second schedule determining a timing of transmitting, to the management target device, one or more acquisition requests to acquire operation information via the network, wherein a period in which the management target device is in the predetermined power supply state is a period during which every acquisition request to be transmitted via the network based on the second schedule fails due to the instruction transmitted based on the first schedule; and
    in a case where the period during which every acquisition request to be transmitted via the network based on the second schedule fails due to the instruction transmitted based on the first schedule overlaps the timing of transmitting the one or more acquisition requests based on the second schedule, automatically generating an adjusted second schedule,
    wherein the period during which every acquisition request to be transmitted via the network based on the second schedule fails due to the instruction transmitted based on the first schedule does not overlap the timing of transmitting the one or more acquisition requests based on the adjusted second schedule, and
    wherein, due to at least a part of the one or more acquisition requests based on the adjusted second schedule, the operation information is acquired at a time other than the period during which every acquisition request to be transmitted via the network based on the second schedule fails due to the instruction transmitted based on the first schedule.

4. The information processing apparatus according to claim 3, wherein the one or more processors further cooperate with the one or more memories to set a third schedule determining a timing of transmitting, to the management target device, a request to set security policy via the network.

5. The information processing apparatus according to claim 4, wherein the one or more processors further cooperate with the one or more memories to execute processing of preventing, for the third schedule setting, overlap between the timing of transmitting the request based on the third schedule and the period during which every acquisition request to be transmitted via the network based on the second schedule fails due to the instruction transmitted based on the first schedule.

6. The information processing apparatus according to claim 3, wherein the device information includes identification information for the management target device.

7. The information processing apparatus according to claim 3, wherein the operation information acquired in response to the one or more acquisition requests includes at least any of status information, counter information, and log information for the management target device, and is stored in the storage unit.

\* \* \* \* \*